United States Patent [19]
Blum et al.

[11] Patent Number: 5,419,139
[45] Date of Patent: May 30, 1995

[54] COMPOSITE CRYOGENIC TANK APPARATUS

[75] Inventors: Celia M. Blum, New Orleans, La.;
Ellis C. Seal, Bay St. Louis, Miss.;
Elizabeth P. Kirn, Metairie, La.

[73] Assignee: Martin Marietta Corporation, Bethesda, Md.

[21] Appl. No.: 166,535

[22] Filed: Dec. 13, 1993

[51] Int. Cl.⁶ ............................................. F17C 1/00
[52] U.S. Cl. .................................. 62/45.1; 220/456
[58] Field of Search ................... 62/45.1; 220/454, 456

[56] References Cited

U.S. PATENT DOCUMENTS

| | | | |
|---|---|---|---|
| 3,101,861 | 8/1963 | Mearns, III et al. | 220/10 |
| 3,118,194 | 1/1964 | Biais | 62/45.1 |
| 3,130,561 | 4/1964 | Hnilicka, Jr. | 62/45.1 |
| 3,139,206 | 6/1964 | Matsch | 62/45.1 |
| 3,410,443 | 11/1968 | Hofmann et al. | 220/9 |
| 3,558,000 | 1/1971 | McCann et al. | 220/63 |
| 3,655,086 | 4/1972 | Trenner | 220/9 |
| 3,692,206 | 9/1972 | Hornbeck | 220/15 |
| 3,713,560 | 1/1973 | Slysh et al. | 220/15 |
| 3,760,971 | 9/1973 | Sterrett | 220/9 |
| 3,795,573 | 3/1974 | Smith et al. | 161/165 |
| 3,929,247 | 12/1975 | Borup | 220/9 |
| 3,972,467 | 8/1976 | Whillock et al. | 229/14 |
| 4,101,045 | 7/1978 | Roberts et al. | 220/404 |
| 4,366,917 | 1/1983 | Kotcharian | 220/442 |
| 4,461,398 | 7/1984 | Argy | 220/422 |
| 4,472,946 | 9/1984 | Zwick | 62/55 |
| 4,507,941 | 4/1985 | Lester et al. | 62/514 R |
| 5,005,362 | 4/1991 | Weltmer, Jr. et al. | 62/45.1 |

*Primary Examiner*—Ronald C. Capossela
*Attorney, Agent, or Firm*—Pravel, Hewitt, Kimball & Krieger

[57] ABSTRACT

An aerospace vehicle fuel pressure, or cryogen tank apparatus includes a tank load bearing wall of composite laminate construction that is lined with a film laminate liner that includes at least two metalized layers bonded with adhesive with the metalized coatings facing each other. The liner is bonded to the load bearing wall with an adhesive. The improved tank apparatus is able to withstand extreme pressure and extreme temperature conditions, and while containing cryogens such as liquid helium and liquid hydrogen.

31 Claims, 1 Drawing Sheet

COMPOSITE CRYOGENIC TANK APPARATUS

BACKGROUND OF THE INVENTION

1. Field of the Invention

The present invention relates to cryogenic storage containers that must withstand extreme temperature and pressure conditions (such as minus four hundred fifty degrees Fahrenheit and/or high pressure in excess of ten thousand p.s.i.). Even more particularly, the present invention relates to a storage container with a composite laminate structural, load bearing wall that is lined with a film laminate. The film laminate preferably includes at least two metalized film layers bonded with an adhesive so that the metalized surfaces of the film layers abut.

2. General Background

A primary application for cryogenic or high pressure tanks is in the space industry. Cryogenic or high pressure tanks are used on launch vehicles and satellites. In any space vehicle, launch vehicle or the like, reduced weight is of utmost importance. This need for a lightweight cryogenic or high pressure tank applies to primary launch vehicles, upper stage launch vehicles and/or orbit maneuvering vehicles.

There are a number of cryogenic tank and composite tank constructions that have been the subject of patents. A recent patent, U.S. Pat. No. 5,005,362 entitled "Cryogenic Storage Container" issued to William R. Weltmer, Jr. et al. The Weltmer '362 patent provides a cryogenic storage container having a pressure vessel surrounded by a vacuum vessel for maintaining a vacuum between the outer wall of the vacuum vessel and the pressure vessel. A pair of intermediate and sub-intermediate heat shields are disposed between the outer wall of the vacuum vessel and the pressure vessel for intercepting the heat that would otherwise be transferred from the vacuum vessel to the pressure vessel. The heat intercepted by the intermediate heat shield is absorbed by liquid nitrogen contained within a liquid nitrogen container. The heat intercepted by the sub-intermediate heat shield is preferably absorbed by liquid neon in a liquid neon storage tank. The liquid nitrogen and neon absorb heat by undergoing a phase change, from liquid to vapor. In order to prevent failure of the liquid nitrogen container, the nitrogen is vented to the atmosphere over a period of time. The vaporized neon, on the other hand, flows into an absorbent canister containing activated charcoal to absorb gaseous neon for regeneration back to liquid neon at a future time.

U.S. Pat. No. 4,507,941 entitled "Solid Subliming Cooler With Radiatively-Cooled Vent Line" discloses the vent line of a space-borne solid subliming cooler formed to provide a heat radiator which radiates much of the heat losses otherwise parasitically conducted back to the cooler, thereby permitting the use of certain high heat capacity cryogens at operating and working temperatures requiring very low operating vapor pressures but without as much parasitic heat conduction loss as is associated with conventionally vented solid subliming coolers.

The Zwick U.S. Pat. No. 4,472,946 provides a cryogenic storage tank with a built-in pump for pumping cryogen directly from the primary storage container consistent with low boil-off losses of cryogen having a outer vessel, an inner vessel and an evacuated insulation space therebetween. A pump mounting tube assembly extends into the interior of the inner vessel and includes an inner pump mounting tube and an outer pump mounting tube joined at their lower rims to define an insulating jacket between the two tubes. The inner pump mounting tube is affixed at its upper end to the outer vessel while the outer pump mounting tube is affixed at its upper end to the inner vessel. The inner pump mounting tube defines a relatively long heat path into the cryogenic container and is itself insulated from the liquid cryogen by a pocket of trapped gas formed within the inner pump mounting tube by heated cryogen. A pump may be introduced through the inner pump mounting tube and is also insulated against contact with liquid cryogen by the trapped gas such that only the lowermost end of the pump is immersed in cryogen thereby minimizing heat leakage into the tank.

The Argy U.S. Pat. No. 4,461,398 provides a storage tank for cryogenic liquefied gases comprising an outer shell, a fluid-tight inner shell defining the storage space containing the liquified gas and an insulating structure provided in the evacuated intermediate space, the insulating structure including a wall made of juxtaposed hollow, evacuated panels, the joints between adjacent panels being tightly covered by elements adapted to take up the cold-induced wall shrinkage, the elements and the inner wall of said juxtaposed panels forming said inner shell.

The Kotcharian U.S. Pat. No. 4,366,917 discloses a cryogenic tank comprising an innermost fluid-confining wall forming a primary barrier made from relatively thin, flexible, impervious, sheet-like laminated building material comprising at least three continuous overlying layers of yielding material adapted to withstand very severe cold conditions, bonded together and consisting of at least one first mechanically strong supporting outer layer, at least one impervious film-like intermediate layer and at least one second inner lining layer providing at least a mechanical and at least temporary protection.

U.S. Pat. No. 4,101,045 issued to Roberts et al. discloses a cryogenic container adapted to store or transport liquified gases, the container including an outer tank formed by walls which have thermal insulation properties and are structurally capable of supporting the load, the walls incorporating a liquid and gas-impervious secondary barrier. Received within the outer tank and readily removable therefrom is a prefabricated independent inner tank constituted by a flexible bladder whose geometry roughly conforms to the contours of the inner surface of the outer tank. The bladder is formed of a synthetic plastic fabric material that is coated to render it liquid and gas-impervious to define a primary barrier, which coated fabric material maintains its flexibility and other physical characteristics at cryogenic temperatures and has sufficient structural strength to sustain the cryogenic liquid load without any danger of rupture even in those areas thereof in which the bladder does not fully conform to the contour of the outer tank surface and is not backed thereby. The Robert '045 patent discusses previous forms of cryogenic containers that proposed employing an inner liner of Mylar, fiberglass or other non-metallic material as a primary barrier.

The Whillock et al. U.S. Pat. No. 3,972,467 provides an improved paper-board laminate for containers for bulk packaging liquids, syrups and pastes which includes a layer of a high strength polymer film and which may also include a layer of aluminum foil.

The Borup U.S. Pat. No. 3,929,247 discloses an internally insulated tank for the transportation and storage of cryogenic liquids, such as liquified natural gas. The inner surfaces of the tank are lined with rigid, closed cell polyurethane foam to which is bonded a thin impervious sheet material, such as aluminum foil.

The Smith et al. U.S. Pat. No. 3,795,573 disclosed a liner for a cryogenic tank that comprises multiple layers of woven polyester fibers such as woven polyethylene terephthalate fibers and stress-oriented polyethylene terephthalate films (MYLAR), and aluminum. The preferred liner comprises two layers of aluminum positioned side by side to provide liquid-vapor permeability. One of the aluminum layers is approximately one mil thick, the other being about one half mil thick. Two layers of polyethylene terephthalate film are positioned on opposite sides of the two layers of aluminum. Each of the film layers is about one half mil thick.

The Sterrett U.S. Pat. No. 3,760,971 discloses a container for cryogenic fluids wherein a first layer of insulating blocks completely lines the interior of the container and at least a portion of one face of each block is bonded to the interior of the container by a cryogenic adhesive. The sides of the insulating blocks have a contractible insulating material completely surrounding them. At least a second layer of insulating blocks is bonded to the first layer of blocks; at least about two percent of the areas common to the faces of the first and second layers of blocks are bonded. The sides of the second layer of blocks are surrounded by a contractible insulating material. The face areas common to the blocks that are not bonded preferably have a substantially non-friction material attached thereto. The layers of blocks are arranged so that there are no direct heat paths to the walls of the container. A membrane of Mylar polyester film completely covers the interior of the container and is sufficiently bonded to the interior layer of blocks to support the Mylar film. Optionally, another layer of insulating blocks can be bonded to the Mylar film and then another layer of Mylar film bonded to this layer of blocks. This is preferred for containers used in transporting cryogen. Where the container is stationary, the top of the container does not have to have the membrane of Mylar film.

The Slysh et al. U.S. Pat. No. 3,713,560 discloses a spaced wall container having an inner wall for containment of fuels, cryogenic liquids, and the like spaced from and connected to, an outer structure by a plurality of tension members to create steady-state stabilizing forces on the outer structure by utilization of the radial and tangential stiffness of the pressurized inner wall. The tension members are spring-biased to ensure tension loading under all conditions. Insulation material is mounted on the tension members between the inner wall and outer structure. Protection against fluid leakage into the insulation material is afforded by a shield interposed between the inner wall and the insulation. The outer structure forms a protective enclosure for the inner wall container in addition to forming the external wall of a Dewar flask when the void between the spaced walls is evacuated.

The Hornbeck U.S. Pat. No. 3,692,206 discloses a system for suspending the inner vessel of multi-walled containers such as used for storing cryogenic fluids. The suspension system is characterized in that elongate members are used to hold the inner vessel in pure tension so that the inner vessel can expand or contract without changing the load on any of the support members, There is also provided locking means to rigidly secure the inner vessel from movement during transport of the container.

The Trenner U.S. Pat. No. 3,655,086 discloses a receptacle for storage of liquified gases at cryogenic temperatures. The disclosed tanks comprise two concentric shells with dished ends. The internal shell is fabricated from layers of glass fabric with organosiloxane treatment. A layer of high tensile wire fabric is incorporated as one of the integral laminae of the internal and external shells. The internal shell is covered with an insulating layer of flexible and rigid urethane foam. This foam is fabricated in contoured or flat blocks of suitable size and shape to conform to the inner shell. The blocks may be separated from the inner shell by multiple layers of metalized polyethylene terephthalate (Mylar), or other material which will reflect radiant heat.

A liner system for retaining liquid in a storage tank is the subject of U.S. Pat. No. 3,558,000. The liner system includes a continuous metallic liner which has sides which are substantially coextensive with the sidewalls of the tank and a bottom which is substantially coextensive with the floor of the tank. Upright expansion joints, provided in the sides of the liner, compensate for expansion and contraction of the sides in a circumferential direction and expansion joints, provided in the bottom of the liner, compensate for expansion and contraction in the bottom of the liner. Hanger members are secured to the upper portion of the tank and are resiliently mounted thereto. The upper end of the sides of the liner engage the resiliently mounted hangers so as to compensate for expansion and contraction of the liner in a vertical direction.

U.S. Pat. No. 3,410,443 entitled "Thermally Insulating Filler" provides a rigid thermally insulating filler bodies composed of aluminum foil laminated to rectangular plastically deformable thermally insulating synthetic-resin foil, opposite ends of the rectangle being bent toward one another to impart a generally cylindrical tubular configuration to the body. The body is open at its opposite axial extremities, while the ends of the rectangle, which are turned toward one another, do not overlap and define a gap between them along a generatrix of the body.

The Mearns et al. U.S. Pat. No. 3,101,861 discloses a vessel for transporting low temperature liquids. The '861 patent is concerned with and adapted for installation in marine vessels wherein a first outer tank shell of rigid and most likely metallic material is provided with a plastic insulating material lining the interior of the tank shell and preferably sprayed in place with an incorporated expanding or foaming medium of suitable kind. The inner surface of the outer tank shell, whether the shell be of metal, plastic, or other material, can be sprayed with a suitable primer before application of the foamed plastic insulation thereunto to prevent oxidation thereof and improve adhesion of the foam.

SUMMARY OF THE PRESENT INVENTION

The present invention provides a composite cryogenic fuel tank of improved construction that includes a multilayer liner. The apparatus of the present invention provides a construction that is of negligible weight increase over comparable unlined composite tanks.

The primary advantage of the thin lined cryogenic composite tank of the present invention is a weight reduction over metal or thick metal lined tanks. Since a primary application for the cryogenic tank apparatus of the present invention is a space vehicle, launch vehicle, satellite, or the like, reduced weight is very important. For example, applications for the apparatus of the present invention include primary launch vehicles, upper stage launch vehicles or orbit maneuvering vehicles for use with a space station.

The present invention provides an aerospace vehicle composite cryogen tank apparatus that includes a composite wall surrounding the interior for containing cryogenic material. This tank must withstand conditions of outer space during use, such as occur more than twenty miles from the earth's surface.

The tank apparatus of the present invention is capable of containing a cryogenic material that has a temperature of as low as minus four hundred degrees fahrenheit (450° F.).

The tank includes a tank wall with an inner surface. A liner is provided for lining the inner surface of the tank wall. The liner has a low permeability to gases and includes a laminate of film layers. The tank wall is preferably of a composite construction that includes a fiber reinforced portion.

The laminate of film layers includes at least two film layers, each having a vacuum deposited metalized coating thereon. A first layer of adhesive bonds the two metalized surfaces together. A second layer of adhesive bonds the liner to the composite tank inner surface.

The liner is preferably very thin, being of a thickness of about 0.5–2.0 mils.

In the preferred embodiment, the layer of adhesive that bonds the two film layers together is a polyester material.

In the preferred embodiment, the layer of adhesive that bonds the liner to the tank wall is a polyester adhesive material.

In the preferred embodiment, the liner provides a low permeability to hydrogen.

In the preferred embodiment, the vacuum deposited metalized coating is about one thousand angstroms in thickness.

The tank wall is preferably of a graphite and epoxy material. The tank wall can be of a kevlar/epoxy material.

The tank is preferably constructed to contain liquid hydrogen at a temperature of about minus four hundred and twenty three degrees fahrenheit.

The composite cryogen tank apparatus of the present invention has very low permeability to hydrogen. It is capable of withstanding the extreme thermal and mechanical strains of a composite liquid hydrogen tank without cracking or debonding of the liner from the composite tank.

The tank apparatus of the present invention utilizes an improved liner arrangement that has a very low weight "penalty". The tank apparatus of the present invention can be constructed in very large tank sizes, and has minimal cost impact over composite tank constructions presently available.

The present invention provides a liner portion that includes preferably two layers of aluminized Mylar. The aluminized Mylar layers provide very low permeability to most gases, possesses some elasticity and resists cracking at minus four hundred and twenty three degrees fahrenheit (−423° F.).

The liner portion of the tank apparatus of the present invention includes two preferably thin (0.5–1.0) mil thick films of aluminized Mylar bonded together with the aluminum faces abutting together using a thermoplastic adhesive therebetween. The use of a thermal plastic adhesive at the aluminized Mylar surfaces bonds the two film layers together while simultaneously protecting the thin (for example about one thousand angstroms) metal coating from damage. The thermoplastic adhesive also provides an extra layer of permeability protection.

To promote adhesion to a composite laminate, the Mylar laminate is coated on one side with a polyester adhesive. This laminate is then co-cured to the composite tank wall.

The liner system disclosed for cryogenic tankage is also applicable to high pressure tankage. The fact that the liner has very low permeability and adds very little weight makes it an excellent candidate for composite high pressure tankage.

The state of the art for composite high pressure tankage is to use a metal liner, which may be either load bearing or may act just as a barrier to leakage of the contained gas. These tanks are expensive and the metal liner adds weight.

The use of the disclosed liner system will reduce weight of these tanks by twenty to forty percent (20–40%) while potentially reducing costs as well.

The types of tanks targeted have operating pressures up to 10000 psi. and come in a variety of sizes. Typical applications include fuel tanks for natural gas vehicles, high pressure helium, nitrogen, and oxygen bottles, portable self contained breathing air tanks, and diving tanks. The application where the weight benefits offer the most pay-off are in pressurization tanks, fuel tanks, and propellant tanks for pressurized propellant systems such as those used on satellites both to achieve and maintain orbit. Similar propulsion systems are also being developed for launch vehicles. Additionally, the liner system may prove beneficial in the bulk transport of pressurized gasses by rail or truck due to the reduced weight and reduced transportation costs.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein.

DETAILED DESCRIPTION OF THE PREFERRED EMBODIMENT

Figure 1:
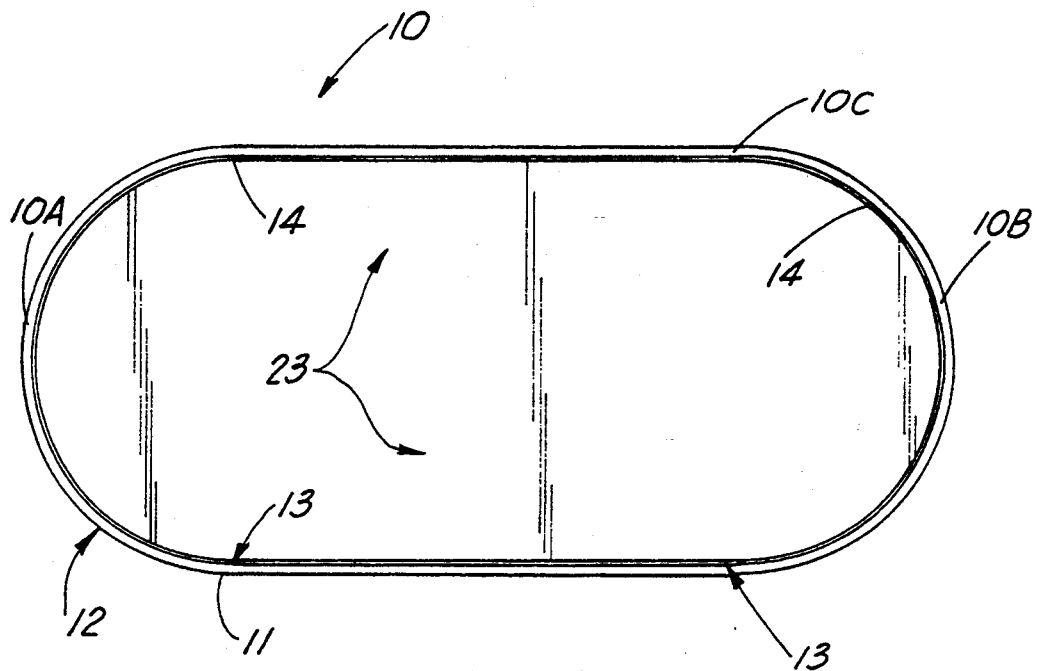
FIG. 1 is a schematic transverse sectional view of the preferred embodiment of the tank apparatus of the present invention.
Figure 3:
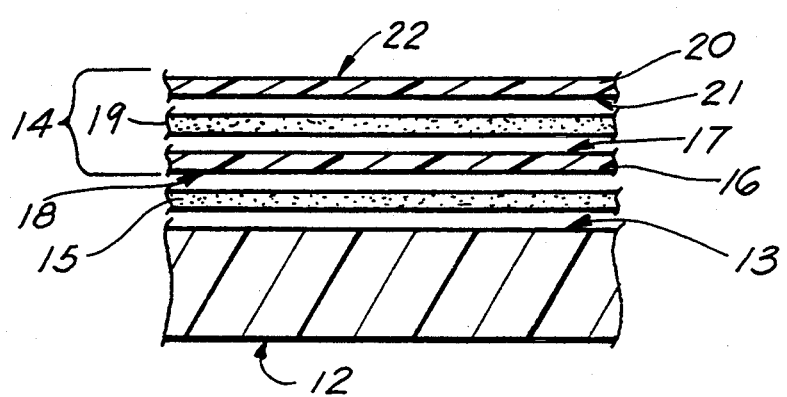
FIG. 3 is a schematic, fragmentary exploded view of the preferred embodiment of the apparatus of the present invention.
Figure 2:
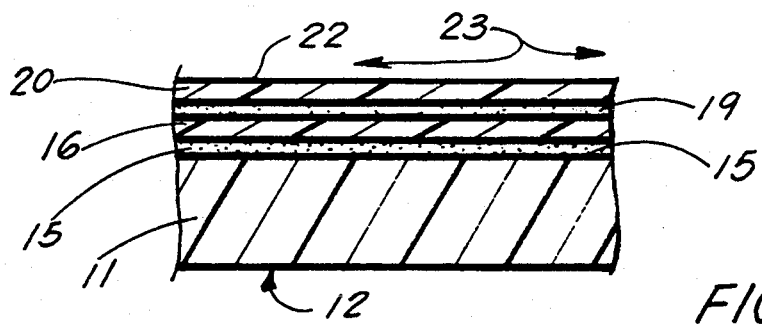
FIG. 2 is a schematic, fragmentary section view of the preferred embodiment of the apparatus of the present invention.

FIGS. 1–3 illustrate the preferred embodiment of the apparatus of the present invention designated generally by the numeral 10. In FIG. 1, tank apparatus 10 is shown as an elongated generally tubular tank having hemispherical or elliptical end portions 101A, 10B, and a central, generally cylindrically shaped portion 10C. The tank 10 has a load bearing tank wall 11 surrounding a tank interior 23. The interior 23 is provided for containing a cryogenic substance such as liquid helium or hydrogen at temperatures below minus four hundred degrees (−400° F.) fahrenheit.

Tank wall 11 has an outer surface 12 and an inner surface 13. Liner 14 is bonded to tank wall inner surface 13 with adhesive layer 15 as shown in FIGS. 2 and 3. The liner 14 includes layers 16, 20 of film and adhesive layer 19 as shown in FIGS. 2 and 3. Two metalized film layers 16, 20 are bonded together with adhesive layer 16. The first film layer 16 has an metalized surface 17 such as vacuum deposited aluminum of about one thousand (1000) angstroms thickness. The metalized surface 17 faces metalized surface 21 of film layer 20. Each film layer 16, 20 provides an opposing surface 18, 22 respectively that face away from the adhesive layer 19. Thus, the metalized surfaces 17, 21 of the film layers 16, 20 respectively communicate with adhesive layer 19. Thus, the adhesive layer 19 provides a protection for the metal coating from damage. The adhesive layer 19 simultaneously provides an extra layer of permeability protection.

Adhesive layer 15 bonds metalized film layer 16 to tank wall inner surface 13. The tank wall 11 is of a composite laminate made from graphite, glass, aramid, Kevlar, or other fiber embedded in an epoxy, polyester, or other matrix material. The opposing surface 22 of metalized film layer 20 communicates with tank interior and the particular cryogen or other material being contained within the tank interior 23.

Each of the adhesive layers 15, 19 are preferably thermoplastic adhesive materials, preferably polyester adhesive. The liner 14 is preferably very thin, being of a thickness of about 0.5–2.0 mils. The tank apparatus 10 of the present invention as described herein can contain cryogenic substances such as liquid helium at a temperature of below minus four hundred degrees (−400° F.). Further, the apparatus 10 of the present invention can contain materials under high pressures of about one thousand to ten thousand psi.

The tank apparatus 10 of the present invention utilizes a very thin and minuscule weight liner 14 thus providing a very low weight "penalty" over existing composite laminate tanks. Further, the addition of the liner 14 as aforedescribed provides minimal cost impact over presently available composite tank constructions.

The following table lists the part numbers and part descriptions as used herein and in the drawings attached hereto.

PARTS LIST

| Part Number | Description |
| --- | --- |
| 10 | tank apparatus |
| 10A | hemispherical portion |
| 10B | hemispherical portion |
| 10C | cylindrical portion |
| 11 | load bearing tank wall |
| 12 | tank wall outer surface |
| 13 | tank wall inner surface |
| 14 | liner |
| 15 | adhesive layer |
| 16 | film layer |
| 17 | metalized surface |
| 18 | opposing surface |
| 19 | adhesive layer |
| 20 | film layer |
| 21 | metalized surface |
| 22 | opposing surface |
| 23 | tank interior |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An aerospace vehicle composite cryogen tank apparatus, comprising:
   a) a space structural tank body having means for containing a cryogenic material;
   b) a tank body having an interior for containing a cryogenic material that has a temperature of as low as minus 400 degrees F.;
   c) the tank body having a tank wall with an inner surface, the tank wall having a composite construction that includes a fiber reinforced portion;
   d) liner means for lining the interior of the tank, said liner means having low permeability to gases and comprising:
      i) a laminate of film layers including at least two film layers, each having a vacuum deposited metalized coating thereon, and a first layer of adhesive bonding the two metalized surfaces together;
      ii) a second layer of adhesive for bonding the liner means to the composite tank inner surface; and
   e) wherein the liner means has a thickness of about 0.5–2.0 mils.

2. The apparatus of claim 1 wherein the layer of adhesive is of a polyester adhesive material.

3. The apparatus of claim 1 wherein the layer of adhesive that bonds the liner means to the tank wall is a polyester adhesive material.

4. The apparatus of claim 1 wherein the liner means has low permeability to hydrogen.

5. The apparatus of claim 1 wherein the vacuum deposited metalized coating is about one thousand angstroms in thickness.

6. The apparatus of claim 1 wherein the tank wall is of a graphite/epoxy material.

7. The apparatus of claim 1 wherein the tank wall is of a Kevlar/epoxy material.

8. The apparatus of claim 1 wherein the apparatus contains liquid helium at a temperature of about minus 423 degrees F.

9. An aerospace vehicle composite cryogen tank apparatus, comprising:
   a) a space vehicle having structural means for containing a cryogenic material;
   b) a tank body having an interior for containing a cryogenic material that has a temperature of as low as minus 400 degrees F.;
   c) the tank body having a tank wall with an inner surface, the tank wall having a composite construction that includes a fiber reinforced portion;
   d) liner means for lining the interior of the tank, said liner means having low permeability to gases and comprising:
      i) a laminate of bonded layers and including at least two film layers, each film layer having a vacuum deposited metalized coating thereon, and a first layer of adhesive bonding the two metalized surfaces together;
      ii) a second layer of adhesive for bonding the liner means to the composite tank inner surface; and
   e) wherein the liner means has a thickness of about 0.5–1.0 mils, and the two film layers are of substantially equal thickness.

10. The apparatus of claim 9 wherein the metalized surfaces are aluminized surfaces.

11. An aerospace vehicle composite cryogen tank apparatus, comprising:
   a) a tank body for containing cryogenic material during use;
   b) the tank body having an interior for containing a cryogenic material that has a temperature of as low as minus 450 degrees F.;
   c) a load bearing wall including an inner surface, the tank wall having a composite construction that includes a fiber portion embedded in a matrix material;
   d) liner means for lining the inner surface of the load bearing wall, said liner means having low permeability to gases and comprising:
      i) a laminate of layers including at least two film layers, each film layer having a metalized surface with a vacuum deposited metalized thereon, and a first layer of adhesive bonding the two metalized surfaces of the two film layers together;
      ii) a second layer of adhesive for bonding the liner means to the load bearing wall inner surface; and
   e) wherein the liner means has a thickness of about 0.5–2.0 mils.

12. The apparatus of claim 11 wherein the first layer of adhesive is of a thermoset resin adhesive material.

13. The apparatus of claim 11 wherein the second layer of adhesive, bonding the liner means to the load bearing wall, is a thermoset resin adhesive material.

14. The apparatus of claim 11 wherein the first layer of adhesive is a polyester resin.

15. The apparatus of claim 11 wherein the second layer of adhesive is a polyester resin.

16. The apparatus of claim 11 wherein the liner means has means for lowering permeability to hydrogen.

17. The apparatus of claim 11 wherein the metalized surfaces are aluminized surfaces.

18. The apparatus of claim 11 wherein the vacuum deposited metalized coating on each film layer is about one thousand angstroms in thickness.

19. The apparatus of claim 11 wherein the load bearing wall is of a graphite and epoxy composite laminate.

20. The apparatus of claim 11 wherein the load bearing wall is of a Kevlar and epoxy composite laminate.

21. The apparatus of claim 11 wherein the apparatus contains liquid hydrogen at a temperature of about minus 423 degrees F.

22. An aerospace vehicle tank apparatus, comprising:
   a) a tank body having structural means for containing a cryogenic material;
   b) the tank body having an interior for containing a cryogenic material that has a temperature of as low as minus 400 degrees F.;
   c) the tank body having a tank wall comprising laminate composite construction that includes a fiber reinforced portion;
   d) liner means for lining the interior of the tank, said liner means having low permeability to gases and comprising:
      i) a laminate of bonded layers and including at least two film layers, each film layer having at least one outer surface with a vacuum deposited metalized coating thereon, and a first layer of adhesive bonding the two metalized surfaces together of each film layer;
      ii) a second layer of adhesive for bonding the liner means to the tank wall; and
   e) wherein the liner means has a thickness of about 0.5–2.0 mils, and the two film layers are of substantially equal thickness.

23. The apparatus of claim 22 wherein the tank wall is a fiber reinforced composite laminate that includes epoxy.

24. The apparatus of claim 22 wherein the tank wall is a composite laminate that includes graphite.

25. The apparatus of claim 22 wherein the tank wall is a fiber reinforced composite laminate that includes polyester.

26. The apparatus of claim 22 wherein the fibers are glass fibers.

27. The apparatus of claim 22 wherein the fibers are aramid fibers.

28. The apparatus of claim 22 wherein the tank wall is a fiber reinforced composite laminate with fibers embedded in a matrix material.

29. The apparatus of claim 28 wherein the fibers are glass fibers.

30. The apparatus of claim 28 wherein the fibers are aramid fibers.

31. The apparatus of claim 22 wherein the metalized surfaces are aluminized surfaces.

* * * * *